United States Patent [19]
Hirano

[11] Patent Number: 5,839,086
[45] Date of Patent: Nov. 17, 1998

[54] ON-BOARD ROUTE DISPLAY RECEIVING INFORMATION FROM EXTERNAL DEVICE

[75] Inventor: Kazuo Hirano, Osaka, Japan

[73] Assignee: Sumitomo Electric Industries, Ltd., Osaka, Japan

[21] Appl. No.: 503,096

[22] Filed: Jul. 17, 1995

[30] Foreign Application Priority Data

Jul. 18, 1994 [JP] Japan .................................. 6-165400
Jul. 5, 1995 [JP] Japan .................................. 7-169861

[51] Int. Cl.$^6$ .......................... G01C 21/00; G06F 165/00
[52] U.S. Cl. .......................... 701/201; 701/211; 340/988
[58] Field of Search .......................... 364/444.1, 444.2, 364/449.5, 449.3, 460, 448; 340/993, 995, 988; 455/99, 89, 54.2; 701/201, 202, 211, 209, 300, 206

[56] References Cited

U.S. PATENT DOCUMENTS

| | | | |
|---|---|---|---|
| 3,899,671 | 8/1975 | Stover | 235/150.2 |
| 4,311,876 | 1/1982 | Endo et al. | 179/15.5 ST |
| 4,350,970 | 9/1982 | Von Tomkewitsch | 340/23 |
| 5,031,104 | 7/1991 | Ikeda et al. | 364/449 |
| 5,126,941 | 6/1992 | Gurmu et al. | 364/424.02 |
| 5,173,691 | 12/1992 | Sumner | 340/905 |
| 5,257,023 | 10/1993 | Furuya | 340/995 |
| 5,289,183 | 2/1994 | Hassett et al. | 340/905 |
| 5,371,678 | 12/1994 | Nomura | 364/444 |
| 5,406,490 | 4/1995 | Braegas | 701/210 |
| 5,410,486 | 4/1995 | Kishi et al. | 364/449 |
| 5,414,630 | 5/1995 | Oshizawa et al. | 364/449 |
| 5,420,794 | 5/1995 | James | 364/436 |
| 5,465,088 | 11/1995 | Braegas | 340/905 |
| 5,508,917 | 4/1996 | Siegle et al. | 364/424.02 |
| 5,521,826 | 5/1996 | Matsumoto | 364/449 |
| 5,565,874 | 10/1996 | Rode | 342/457 |

FOREIGN PATENT DOCUMENTS

| | | |
|---|---|---|
| 0288068 | 10/1988 | European Pat. Off. . |
| 62-224898 | 10/1987 | Japan . |
| 63-095314A | 4/1988 | Japan . |
| 1-112414 | 7/1989 | Japan . |
| 2-129800 | 5/1990 | Japan . |
| 4-108300 | 9/1992 | Japan . |
| 06111191A | 4/1994 | Japan . |

OTHER PUBLICATIONS

"Trend of Automobile Navigation System" by Takashi Nomura and Masakazu Tsunoda; Journal of Electric Engineering Japan; J. IEEE Japan, vol. 112, No. 4, 1992, pp. 249–252.

Primary Examiner—Michael Zanelli
Attorney, Agent, or Firm—W. F. Fasse; W. G. Fasse

[57] ABSTRACT

A system for providing and displaying recommended navigation information in a vehicle includes a simple on-board display, a destination selection input keyboard, a beacon receiver, a beacon transmitter and a computer control device on-board the vehicle, in connection with a roadside beacon that is further in communication with a centralized traffic information center. When a destination intersection is selected and set with the input keyboard, the beacon transmitter transmits the destination intersection information together with an ID number of the vehicle to the traffic information center via the beacon. Recommended route information leading to the destination intersection, road junction information, and available lane direction information are transmitted from the traffic information center via the beacon to the beacon receiver. The simple display shows the recommended route as a simplified graph of connected line segments from the received recommended route information and various other information. An audio output device provides vocal guidance messages. All these operations are controlled by the computer control device. Therefore, the device does not have to store and display map data. Names and coordinates or codes of intersections are stored in the control device. The user can easily enter a destination intersection by specifying a name of an intersection using the input keyboard.

19 Claims, 8 Drawing Sheets

ON-BOARD ROUTE DISPLAY RECEIVING INFORMATION FROM EXTERNAL DEVICE

BACKGROUND OF THE INVENTION

1. Field of the Invention

The present invention relates to an on-board route display and traffic information transmission device. More particularly, the present invention relates to an on-board route display receiving information from an external device, and a traffic information transmission device that transmits information to a vehicle.

2. Description of Related Art

A conventional car navigation device which is an example of an on-board route display includes map data to show a recommended route to a destination for a driver, i.e. user, using the map data.

A great amount of many types of various data such as complicated route network, railways, rivers, facilities, celebrated localities, and historic sites is included in the map data. The map data is displayed in color on a display with a cathode ray tube or color liquid crystal screen. A recommended route is also displayed in color on the display.

In such a conventional car navigation device, the current position of the vehicle is identified by a GPS (Global Positioning System) receiver for receiving radio waves from a GPS satellite. In these devices, a recommended route which is the most efficient route to arrive at a destination is detected on the basis of information of the destination entered by an input device such as a remote control or the like and information regarding the identified current position of the vehicle. For this operation, a conventional car navigation device has typically included a memory device including a CD-ROM of a large capacity for storing information of routes that can be travelled by a vehicle and a CD drive for driving that CD-ROM.

In order to maintain the above-described map data, a CD-ROM of a great storage capacity and a memory device including a CD drive therefor are required. Such a memory device is expensive, and there was a problem of increasing the cost of the car navigation device.

Similarly, there was a problem that a display including a cathode ray tube or a color liquid crystal screen results in increase of the cost of the car navigation device.

Furthermore, the requirement of an GPS receiver for receiving radio waves from a GPS satellite in a conventional car navigation device is attributed to the high cost of a car navigation device.

SUMMARY OF THE INVENTION

In view of the foregoing, an object of the present invention is to provide an economic on-board route display.

Another object of the present invention is to provide an on-board route display of favorable usability.

The above objects of the present invention can be achieved by an on-board route display including components as set forth in the following. More specifically, a route display according to the present invention is an on-board route display obtaining a recommended route to a destination from an external device installed on or along a road, including a memory unit for storing names of intersections and information for identifying an intersection corresponding to the name of an intersection, a setting unit for selecting and setting the name of a desired intersection as a destination from among the stored names of intersections, a transmitter for transmitting information to identify an intersection corresponding to the set intersection name to an external device on the basis of information stored in the memory unit, a receiver for receiving from an external device recommended route information regarding the recommended route to an intersection corresponding to the name of the set intersection, and an indicator unit for indicating a recommended route to the user by using a simple graphic figure on the basis of the received recommended route information.

The route display of the present invention stores names of intersections and information for identifying an intersection corresponding to the name of an intersection to select and set the name of a desired intersection as a destination from among the stored names of intersections. Information for identifying an intersection corresponding to a set intersection name according to information stored in the memory unit is transmitted to an external device, and recommended route information for travelling to an intersection corresponding to the set intersection name is received from the external device, whereby the recommended route is indicated to the user according to the received recommended route information using a brief map. Since it is not necessary to maintain in or to display map data in detail, the structure of the device can be simplified to allow provision of an economic on-board route display. The user can set a destination using the name of an intersection.

A traffic information transmission device according to another aspect of the present invention includes a beacon device installed at a road side, a plurality of transmitter-receiver units provided with respect to each of a plurality of traffic lanes, and a connection unit for connecting the beacon device to each of the plurality of transmitter-receiver units. Each transmitter-receiver unit includes an identity code for identifying each respective transmitter-receiver unit. Each transmitter-receiver unit transmits information for identifying a lane with respect to a vehicle running on each lane according to the identity code.

As a result, the traffic information transmission device can transmit information efficiently to a vehicle running on any of the plurality of lanes.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A car navigation device which is an embodiment of an on-board route display of the present invention will be described hereinafter with reference to the drawings.

Figure 1:
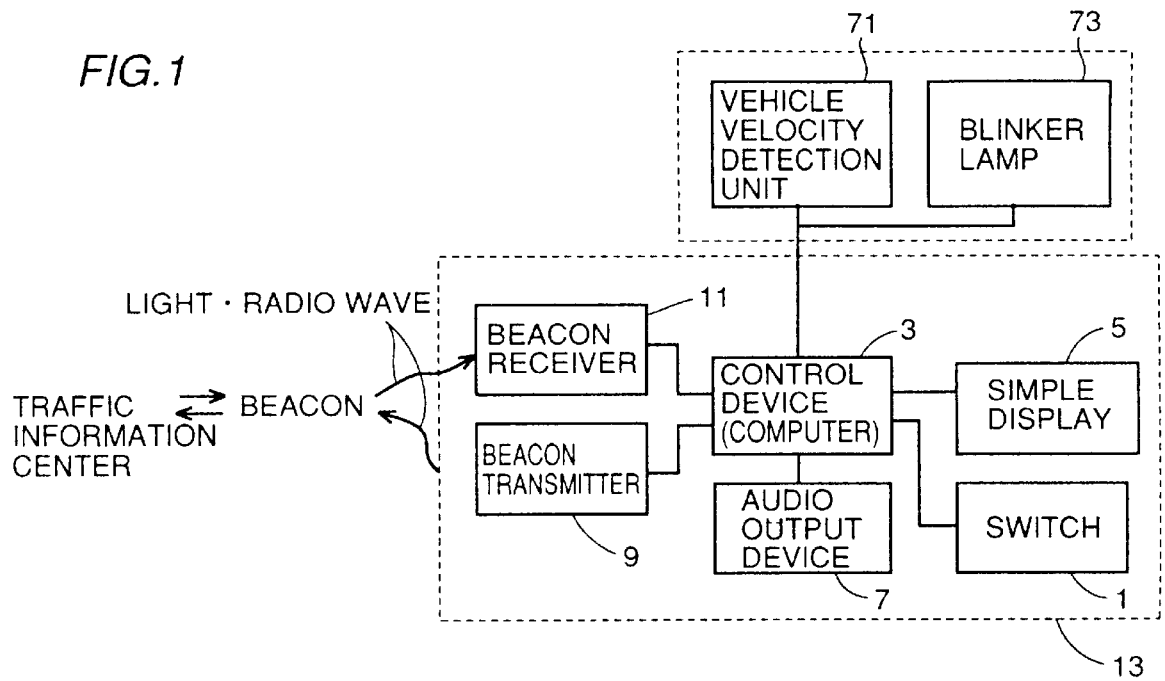
FIG. 1 is a block diagram showing a car navigation device according to an embodiment of the present invention.

Referring to FIG. 1, a car navigation device 13 includes a switch or input keyboard 1, a control device (computer) 3 including a memory device such as a ROM or RAM, a simple display 5, an audio output device 7, a beacon transmitter 9 and a beacon receiver 11 for communication with a beacon which is an external device installed on or along a road. Although a beacon installed on or along a road is used as an external device in the present embodiment, any device may be used as long as it has a similar function of transmitting information.

More specially, the exchange of information such as the recommended route information, road junction information, and available lane direction information between a vehicle and a traffic information center is carried out through a beacon installed on or along a road or road side, which applies throughout the present application when the phrase "installed on a road" is used.

The phrase "beacon installed on a road" further implies a machine or device of a traffic information system that transmits information by a beacon method. For the sake of simplicity, is referred to herein as a beacon on a road or a beacon installed on a road.

Control device (computer) 3 stores names of intersections, and coordinates (or codes) corresponding to each intersection. According to the name of an intersection and coordinates (or codes) corresponding to that intersection, a destination can be indicated by specifying the name of an intersection closest to the destination, i.e. a destination can be selected by specifying the name of an intersection. The name of an intersection and coordinates (codes) corresponding to that intersection become the basis of detecting a recommended route. The node number according to UTMS (Universal Traffic Management System), for example, may be used as the code.

Switch or input keyboard is operated by the user in order to set an intersection closest to the destination (referred to as "destination intersection" hereinafter). Control device (computer) 3 is connected to a simple display 5, an audio output device 7, a beacon transmitter 9, and a beacon receiver 11. Simple display 5 and audio output device 7 are operated in connection with setting the destination intersection by switch or input keyboard 1. Simple display 5 displays a list of stored names of intersections in characters. Audio output device 7 vocally guides operating switch or input keyboard 1. Upon completion of the setting, control device (computer) 3 provides coordinates (or a code or codes) of an intersection corresponding to the set name of the destination intersection into beacon transmitter 9.

Beacon transmitter 9 converts information of the destination intersection applied from control device (computer) 3 into a signal (such as a radio wave or a light signal), and transmits the converted signal to a beacon on a road. Beacon receiver 11 receives a signal (radio wave or light signal) indicating a recommended route to the destination intersection or the current position (absolute coordinate) of the vehicle from a road side beacon that is currently being passed by the vehicle. The received signal is transmitted to control device (computer) 3.

Control device (computer) 3 provides to simple display a recommended route on the basis of a signal representing a recommended route to the destination intersection received by beacon receiver 11, and simultaneously actuates audio output device 7. Simple device 5 displays a recommended route applied from control device 3 by means of a diagram (brief pattern figure) represented by characters and simple patterns on the basis of an intersection on the recommended route.

Figure 2:
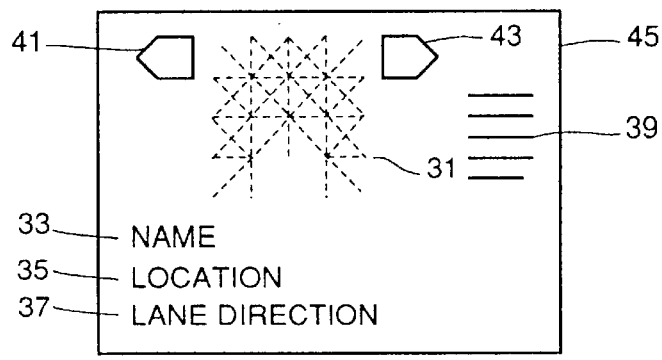
FIG. 2 specifically shows a display screen 45 prior to display of a recommended route in the display 5 of FIG. 1 according to the present invention.

FIG. 2 is a diagram showing a specific example of display screen 45 of simple display 5 prior to displaying a recommended route Referring to FIG. 2, display screen 45 includes a recommended route display 31, a name display 33, a location name display 35, an available lane direction display 37, a bar representation 39, a left blinker display 41, and a right blinker display 43.

Recommended route display 31 shows a brief pattern figure of a recommended route received by beacon receiver 11 from a beacon on a road. The dotted line in recommended route display 31 indicates the basic route outline of the brief pattern figure.

The name of the roadway on which the vehicle is currently travelling appears at name display 33. Location name display 35 shows a list of the names of interconnections when an intersection of the destination is being specified, and the name of an intersection that the vehicle has passed while running along on the recommended route. Available lane direction display 37 shows the direction of the available lane at the next intersection of the lane on which the vehicle is currently running. The direction in which by the vehicle is to travel according to the recommended route is highlighted by bright lines or bold lines to be differentiated from other driving directions in the lane direction display 37.

Bar representation 39 is formed of 5 lines of bars. The distance from the current position to the next intersection is expressed or represented as corresponding to the number of bars that are displayed. The distance between the current position of the vehicle and the next intersection on the recommended route is obtained on the basis of the velocity of the vehicle and information from a beacon. The number of bars displayed in the bar representation decreases in proportion as the vehicle approaches the next intersection. All the bars disappear i.e. no bars are displayed, at the time when the next intersection is reached. Then, a bar representation is newly displayed representing the distance to the next intersection. In a similar manner, the bar representation is updated every time an intersection is passed. The whereabouts or location of the vehicle on the recommended route can be identified by the driver on the basis of reduction of the number of bars in the bar representation.

A process set forth in the following is carried out for the display of a bar representation.

A signal indicating the velocity of the vehicle is input to control device 3 of FIG. 1. The distance S (km) to the next intersection from a beacon is entered via beacon receiver 11. Upon entry of distance S, all the five bars are displayed, and the value of S is registered in a distance register within control device 3. The elapse time in seconds is measured by an internal clock signal of control device 3. Velocity v of the vehicle in km/sec. is measured at the elapse of every second. The value of v is subtracted from the value of the distance register. The displayed number of bars corresponds proportionately or relatively to the value of the distance register.

The distance covered by the vehicle starting from the passage of one preceding intersection may be directly input instead of the signal indicating the velocity of the vehicle effectively calculated for reducing the number of bars in the bar representation, as the vehicle travels, according to the relationship between the distance between one intersection and another intersection, and the input distance the vehicle has covered.

Also, the number of bars is not limited to 5 lines. Furthermore, the number of bars can be made to correspond to the distance from the current position to the next turning corner.

Left blinker display 41 or right blinker display 43 is turned on appropriately when the vehicle changes its running lane or turns to the left or right according to the recommended route. When an automatic blinker function is provided, an appropriate blinker lamp of the vehicle corresponding to a left turn or a right turn is simultaneously turned on automatically.

An automatic blinker function serves to turn on the blinker lamp of the vehicle automatically.

By virtue of the above-described indication to change the lane and left and right blinker displays, the required lane exchange or steering to the right or left during travel of the recommended route is facilitated. Travel according to a recommended route in this manner is more convenient than in the case where only a brief pattern figure is used.

Furthermore, the provision of an automatic blinker function eliminates the need of the driver to operate the blinker lamp of the vehicle in turning to the right or left or changing the lane to facilitate the driving operation.

The velocity of the vehicle (car speed) can be obtained by measuring the rotation of the driving wheel. The timing of reduction in the number of bars displayed in bar representation 39 and the timing of displaying a blinker for turning to the left or the right at an intersection are detected or controlled based on the car speed.

Figure 3:
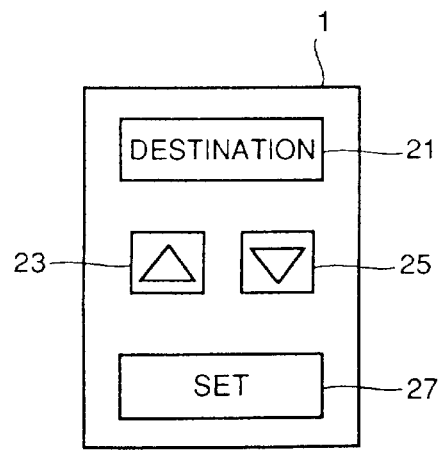
FIG. 3 is a diagram showing a structure of switch or input keyboard 1 of FIG. 1 of the present invention.

FIG. 3 shows an example of the arrangement of switch or input keyboard 1 of FIG. 1.

Referring to FIG. 3, switch or input keyboard 1 includes a "destination" button 21, a "Δ" button 23, a "∇" button 25, and a "set" button 27. The arrangement of these buttons is not limited to that shown in FIG. 3.

"Destination" button 21 is depressed when a set menu of a destination intersection is to be selected. By depressing "destination" button 21, a list of the names of intersections appears at name display 33 on display screen 45 of simple display 5 of FIG. 1. Here, the driver or user is prompted by a vocal message of "Please select destination intersection" from audio output device 7 of FIG. 1. The user can manipulate the switch smoothly according to the vocal guidance. The intersection name list has the names stored in alphabetical order, for example, to facilitate the search or a name. The user can scroll up the list using "Δ" button 23 and scroll down the list using "∇" button 25 to search for the name of an intersection. "Set" button 27 is depressed when the appropriate destination intersection is displayed on name display 33 by scrolling the intersection name list using "Δ" button 23 and "∇" button 25. As a result, that intersection is set as the destination intersection.

Figure 4:
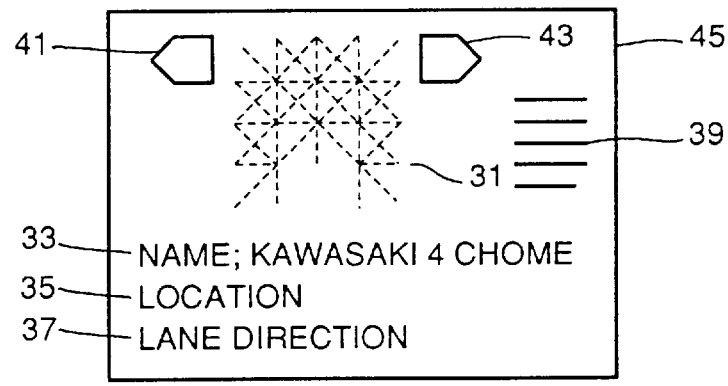
FIG. 4 is a diagram showing a specific example of a display screen 45 of simple display 5 when "destination" button 21 of a switch or input keyboard 1 in FIG. 3 of the present invention is depressed.

FIG. 4 shows a specific example of a display of display screen 45 of simple display 5 of FIG. 1 when "destination" button 21 of FIG. 3 is depressed.

In FIG. 4, "Kawasaki 4 chome" in name display 33 is one of the intersection names on the intersection name list.

In the above-described embodiment, the list of the names of the intersections are stored in the navigation device per se. However, it is possible to provide a booklet or the like including names of intersections and corresponding code numbers or bar codes, and to specify a destination intersection by looking up the corresponding code in the booklet.

Upon completion of the setting, a code corresponding to the specified destination intersection name (a code number, for example) is transmitted together with the ID number of the vehicle to a beacon installed on a road. The beacon installed on the road returns a recommended route to the vehicle on the basis of the code transmitted from the vehicle and the ID number of the vehicle.

Recommended routes corresponding to a plurality of destinations that are calculated and processed at the traffic information center are stored in the beacon installed on a road. The data of the recommended routes are updated periodically. A selected recommended route is transmitted from the beacon installed on the road on which the vehicle is currently running or travelling to be received by the vehicle having the above-described ID number. Road junction information is also received at the same time.

Road junction information refers to information for applying or converting the configuration of a turning or junction of a road such as an intersection into the form of a brief pattern figure. The information is used to determine the most appropriate display of a brief pattern figure. For example, for an intersection turning to the right, a brief pattern figure having a right corner at a most appropriate angle of 45°, 90°, and 135° is determined.

Roads between intersections (referred to as links) are assigned numbers. A recommended route to a destination intersection is represented by a link number sequence. A recommended route can be displayed by a brief pattern figure on the basis of the link number sequence from a beacon on the road at the current position and the next beacon on the road, and the above-described road junction information. More specifically, steering to the left or the right is determined on the basis of the link number and the road junction information.

The current position of a vehicle is determined according to coordinates representing the location of a beacon installed on the road where that vehicle is running. Prestored map data and a GPS receiver are not used as in conventional devices. Therefore, the structure of the device is further simplified in comparison with a conventional one.

Figure 5A:
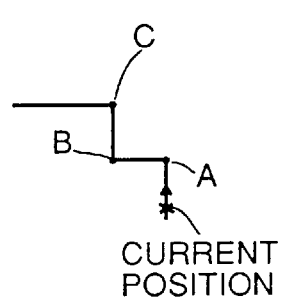
FIGS. 5a–5c are diagrams for describing a method of displaying a recommended route in a recommended route display 31 of FIG. 2 according to the present invention.
Figure 5B:
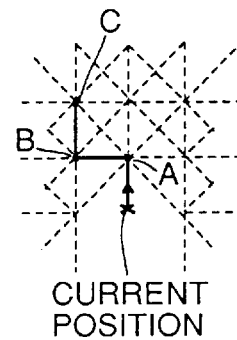
Figure 5C:
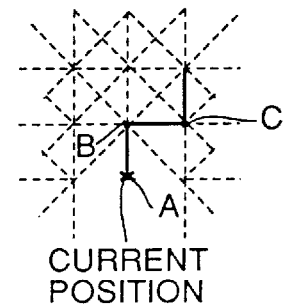

FIGS. 5a–5c are diagrams for describing a method of displaying a recommended route in recommended route display 31 of FIG. 2.

It is assumed that there is a recommended route as shown in FIG. 5a. Points A, B and C are the left and right turning corners at the intersections. FIG. 5b shows 3 links of the recommended route of FIG. 5a in recommended route display 31 of display screen 45 of brief display 5 of FIG. 1 before the vehicle has reached point A along the recommended route. FIG. 5c shows the display of recommended route display 31 when the vehicle has come to point A and is travelling toward point B of the recommended route. The recommended route is displayed so that the heading direction of the vehicle is always directed at the top of the display screen.

Figure 6:
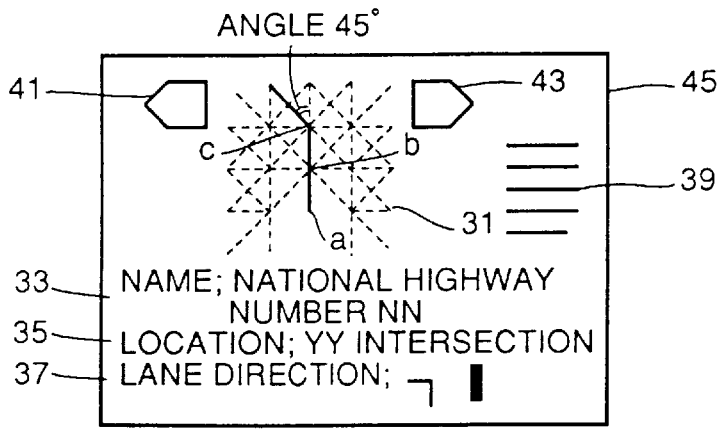
FIG. 6 shows a specific example of the display of display screen 45 of simple display 5 in FIG. 1 when a vehicle passes a beacon installed in the proximity of "YY intersection" according to the present invention.

FIG. 6 is a diagram showing a specific example of the display of display screen 45 of simple display 5 of FIG. 1 when the vehicle passes a beacon installed in the proximity of "YY intersection".

Referring to FIG. 6, a recommend route of 3 links including the link of the current location of the vehicle is shown in solid lines by means of a brief pattern figure in recommended route display 31. Point a is the intersection of the current location of the vehicle, point b is the next intersection, and point c is the further next successive intersection. It is appreciated that a left corner must be turned at approximately 45° at the second next intersection at point C according to the recommended route provided from the traffic information center.

Although 3 links are displayed in the example, the number of links is not limited to 3 as long as it is within a highly perceptible range in the brief pattern figure.

It is appreciated that the vehicle is running or travelling in the proximity of "YY intersection" of "National Highway No. NN" from name display 33 and location display 35. a vocal guidance message like "YY intersection of national highway number NN is passed".

Available lane direction display 37 indicates the available advance direction of the lane on which the vehicle is travelling on the roadway, i.e. National Highway No. NN. Indication of the direction that the vehicle should travel according to the recommended route is highlighted in bright or bold lines to distinguish from the display of other available lane directions. In FIG. 6, it is appreciated that the direction in which the vehicle is to advance is straight ahead since the straight forward direction is displayed in a bold solid line. It is also appreciated that the lane does not have to be changed in order to turn to the left at the second next intersection since a leftward available lane direction is displayed.

The number of bars in bar representation 39 is reduced as intersection b is approached.

Figure 7:
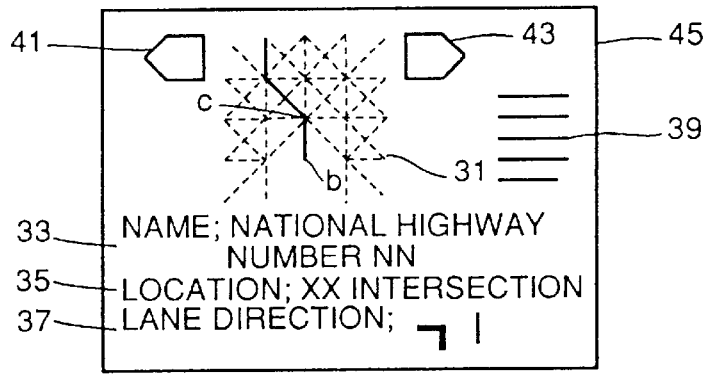
FIG. 7 is a diagram showing a specific example of a display of an available lane direction display 37 when a vehicle arrives at an intersection b of the recommended route of FIG. 6 according to the present invention.

FIG. 7 is a diagram showing a specific example of a display of display screen 45 of simple display device 5 of FIG. 1 when the vehicle arrives at intersection b of the recommended route of FIG. 6.

In FIG. 7, it is appreciated that intersection b is the "XX intersection" of "National Highway No. NN" from name display 33 and location display 35. Here, there is a vocal guidance message like "XX intersection of national Highway number NN is being passed will be emitted " from audio output device 7 of FIG. 1.

In available lane direction display 37, a leftward available lane direction display is indicated in a bold solid line since the vehicle must turn to the left at the next intersection c according to the recommended route.

The number of displayed bars in bar representation 39 is reduced as the vehicle comes closer to intersection c.

Figure 8:
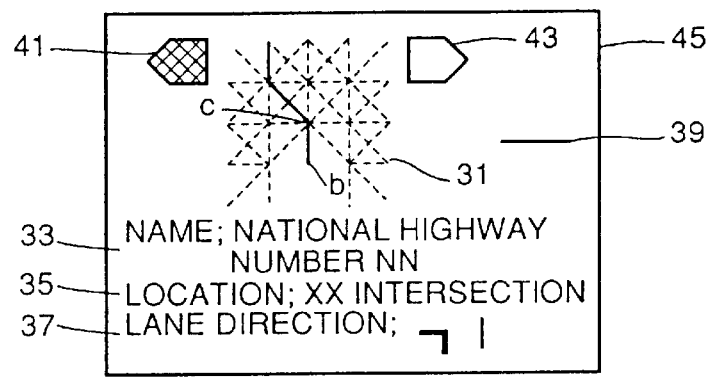
FIG. 8 shows a specific example of a display of display screen 45 of simple display 5 of FIG. 1 when a vehicle arrives just short of an intersection c of the recommended route of FIG. 6 according to the present invention.

FIG. 8 is a diagram showing a specific example of a display of display screen 45 of simple display 5 of FIG. 1 when the vehicle is located just short of intersection c of the recommended route of FIG. 6.

In FIG. 8, left blinker display 41 is turned on to notify the driver (user) to turn to the left. When an automatic blinker function is provided, the blinker lamp of the vehicle is turned on automatically simultaneously with left blinker display 41 being turned on. Here, is a vocal guidance message such as "Shortly turning to the left" will be emitted from audio output device 7 of FIG. 1. By virtue of the audio guidance, the driver (user) can be notified of the recommended route even when he or she is not looking at display screen 45.

The vocal guidance from audio output device 7 is interrupted when the vehicle blinker lamp is operated on the assumption that the guidance message was received and noted by the driver (user).

A switch may be provided to disable audio output device 7 when the driver (user) does not require vocal guidance. This means that vocal guidance can be provided in a required amount and only when necessary without being annoying to the driver by providing undesired audio output.

A signal such as the ID number of a vehicle is transmitted from that to a beacon on a road, the beacon receiving the signal determines the lane of the vehicle transmitting the signal, and transmits lane information to the vehicle. Available lane direction information is selected and displayed in that vehicle on the basis of the transmitted lane information.

When the vehicle is travelling in a lane that does not allow turns or travel in the left direction, the vehicle must first change to a lane where travel to the left direction is possible and then turn the left corner.

Figure 9:
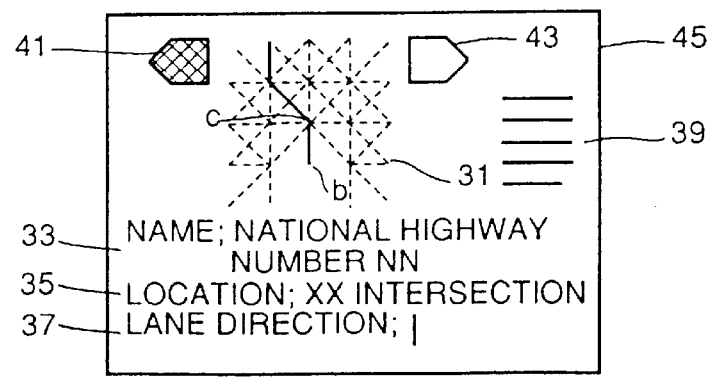
FIG. 9 shows a specific example of a display of display screen 45 of simple display 5 of FIG. 1 when a vehicle passes intersection b of the recommended route of FIG. 6 and is located at a lane that cannot advance leftwards.

FIG. 9 is a diagram showing a specific example of a display of display screen 45 of simple display 5 of FIG. 1 when the vehicle passed intersection b on the recommended route of FIG. 6 and is located on a lane where advance to the left direction is not possible.

Referring to FIG. 9, it is appreciated that the lane on which the vehicle is travelling allows only a straight driving travel, and the vehicle cannot turn to the left, from available lane direction display 37. Here, a vocal guidance message such as "The car cannot turn to the left on this lane, change to first lane" is emitted from audio output device 7 of FIG. 1. Left blinker display 41 is turned on to prompt the drive to change to the first lane. In this example it is assumed that "National Highway No. NN" on which the vehicle is travelling has 3 lanes, and a left turn is possible at the first or leftmost lane.

Upon changing to the first lane according to the guidance information, the display of display screen 45 of simple display 5 of FIG. 1 follows the same course of the above-described FIGS. 7 and 8 as coming closer to intersection c.

Figure 14:
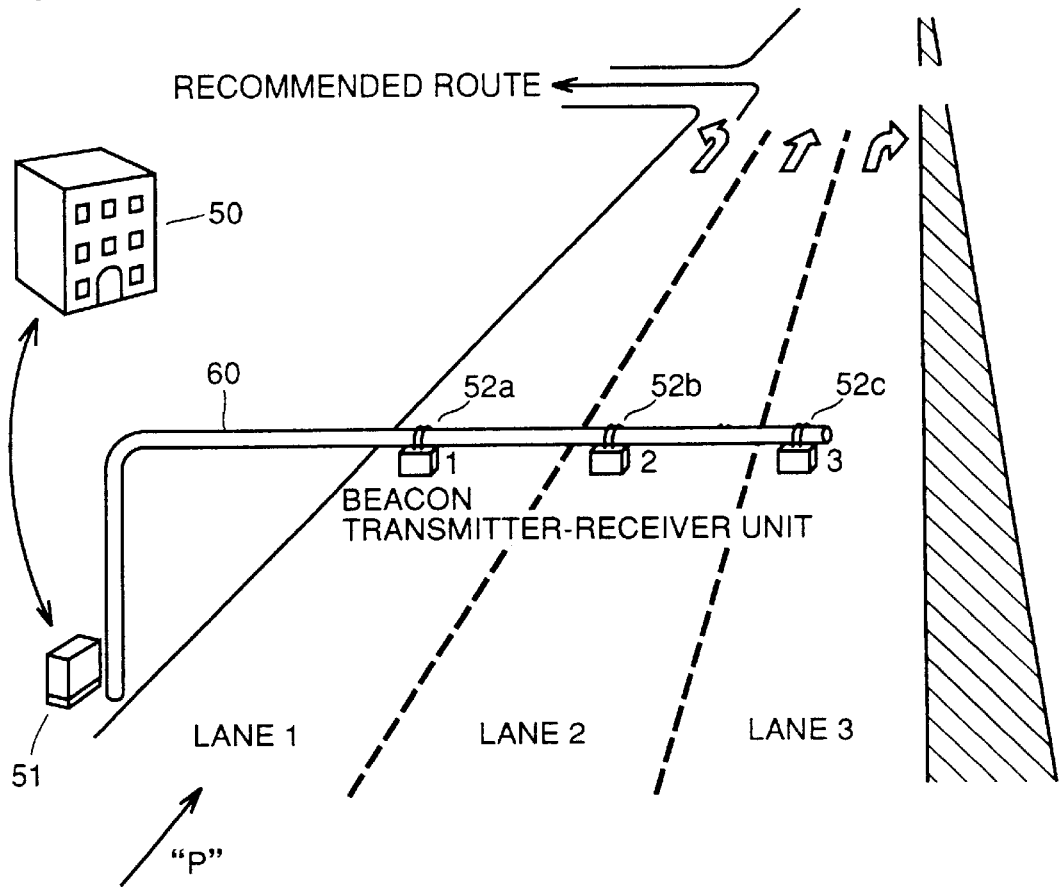
FIG. 14 is a perspective view of a traffic information transmission device.

A traffic information transmission device as shown in FIG. 14 is used to identify the lane on which the vehicle is currently travelling. Referring to FIG. 14, the traffic information transmission device includes a beacon 51 installed at a road side, and transmitter-receiver units 52a–52c, and a connection unit 60 for electrically connecting beacon 51 with each of transmitter-receiver units 52a–52c. Beacon 51 receives traffic information varying over time by communication from a traffic information center 50, and transmits road traffic information and lane information relating to the currently travel lane with respect to a vehicle in transit on a lane via transmitter-receiver units 52a–52c. Although a beacon may be provided on each lane, such a provision will increase the cost. Therefore, it is desirable to install a beacon at road side and provide only a transmitter-receiver unit on each lane.

Figure 15:
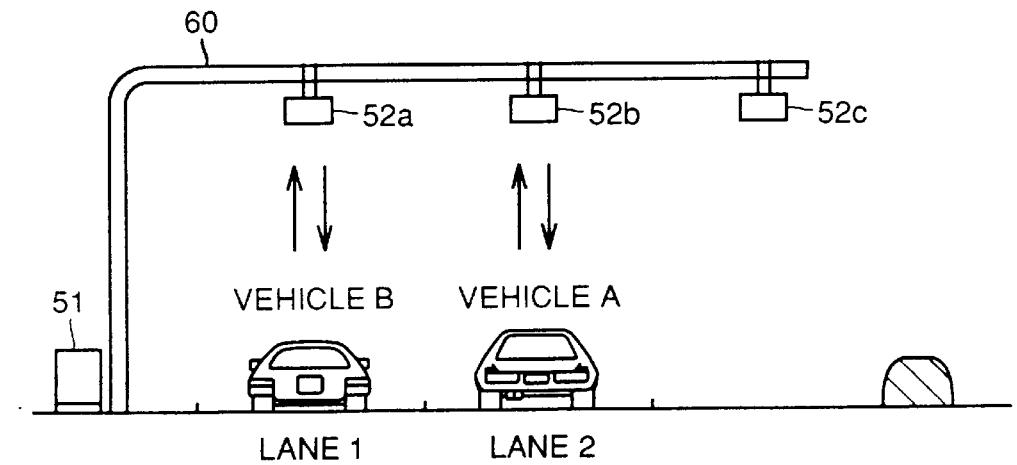
FIG. 15 is a diagram of the traffic information transmission device of FIG. 14 viewed from the "P" side.
Figure 16:
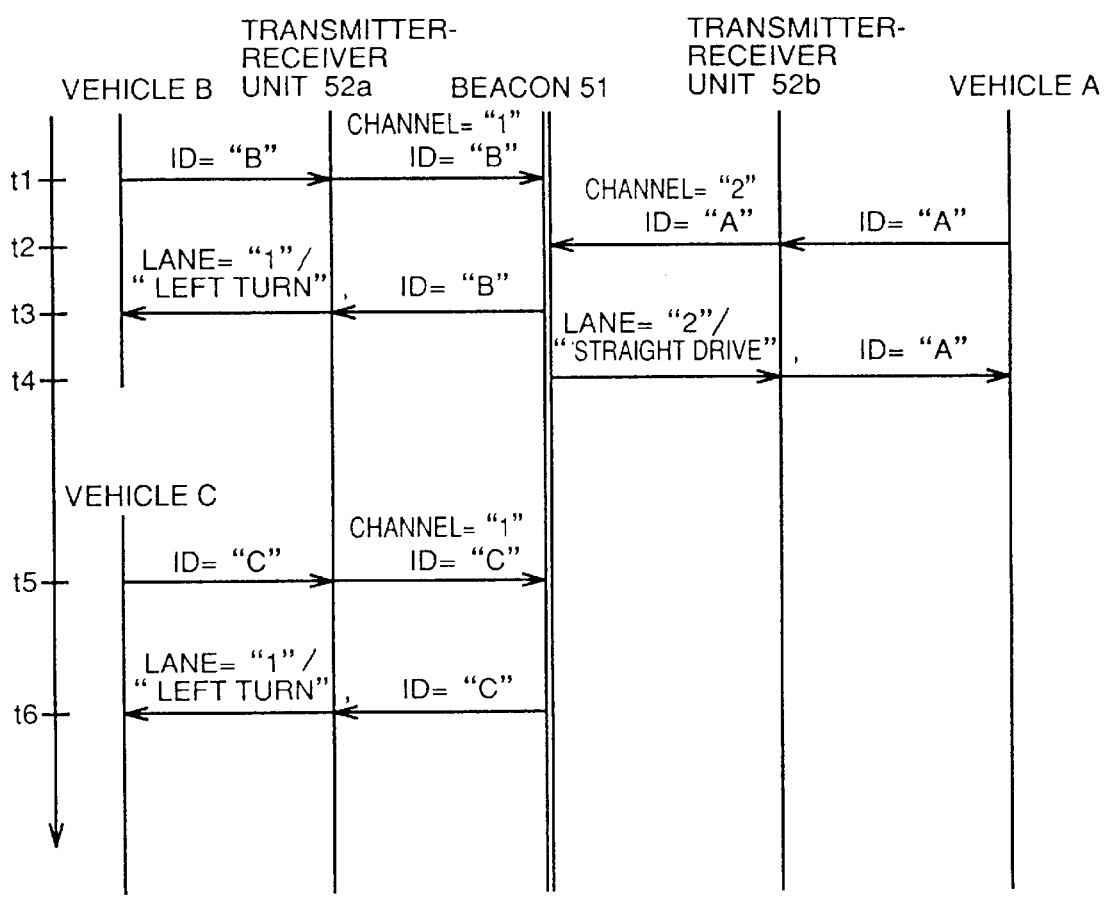
FIG. 16 is a timing chart showing a specific example of a procedure carried out by the traffic information transmission device shown in FIG. 14.

FIG. 15 is a diagram viewed in the direction of "P" in FIG. 14, and FIG. 16 is a diagram for describing the actual exchange of information between a beacon and a vehicle.

The exchange of information between a vehicle and a traffic information transmission device will be described hereinafter with reference to FIGS. 14 and 15 in the case where a vehicle B runs or travels on a lane 1, and then a vehicle A runs or travels on a lane 2. time t1 in FIG. 16, ID information "B" which is an ID code of vehicle B is transmitted from vehicle B to transmitter-receiver unit 52a installed right above lane 1 on which vehicle B is running. Upon receiving an ID code, transmitter-receiver unit 52a immediately sends a channel code of "1" which is an identity code of transmitter-receiver unit 52a and the vehicle ID code of "B" to beacon 51. At time t3, beacon 51 sends to vehicle B via transmitter-receiver unit 52a the lane information of "1" which is information for vehicle B to identify the current travel lane, "left turn" information which is the individual available lane direction information indicating the available direction of advance in lane 1 on which vehicle B is currently running, and information of "B" which is the ID code of the vehicle from which the transmission was issued. Thus, vehicle B can obtain information of the current running lane and available lane direction.

Similarly, beacon 51 receives information from vehicle A traveling on lane 2 via transmitter-receiver unit 52b at time t2, and sends information indicating the lane currently travelled by vehicle A and the individual available lane direction information to vehicle A at time t4.

When a vehicle C is in transit on lane 1 at time t5, beacon 51 sends information regarding the current lane on which vehicle C is running and the individual available lane direction information, and ID code of vehicle C to vehicle C via transmitter-receiver unit 52a at time t6.

In such a traffic information transmission device, it is desirable to use light of high directivity for communication with a vehicle. This is because there is a possibility of affecting a transmitter-receiver unit of a different lane if a radio wave of low directivity is used.

Since the traffic information varies over time, there is a case where a recommended route obtained from a beacon differs from that obtained from the previous beacon. A recommended route switch is provided so that the driver (user) can select the new recommended route or the current recommended route. The intention of the driver (user) can be reflected in determining the route by this recommended switch. Alternatively, the operation may be simplified by switching the display to the new recommended route by automatic determination. When the route is switched to a new recommended route, a vocal guidance message such as "Changed to the new route," will be emitted from audio output device 7 of FIG. 1.

Figure 10:
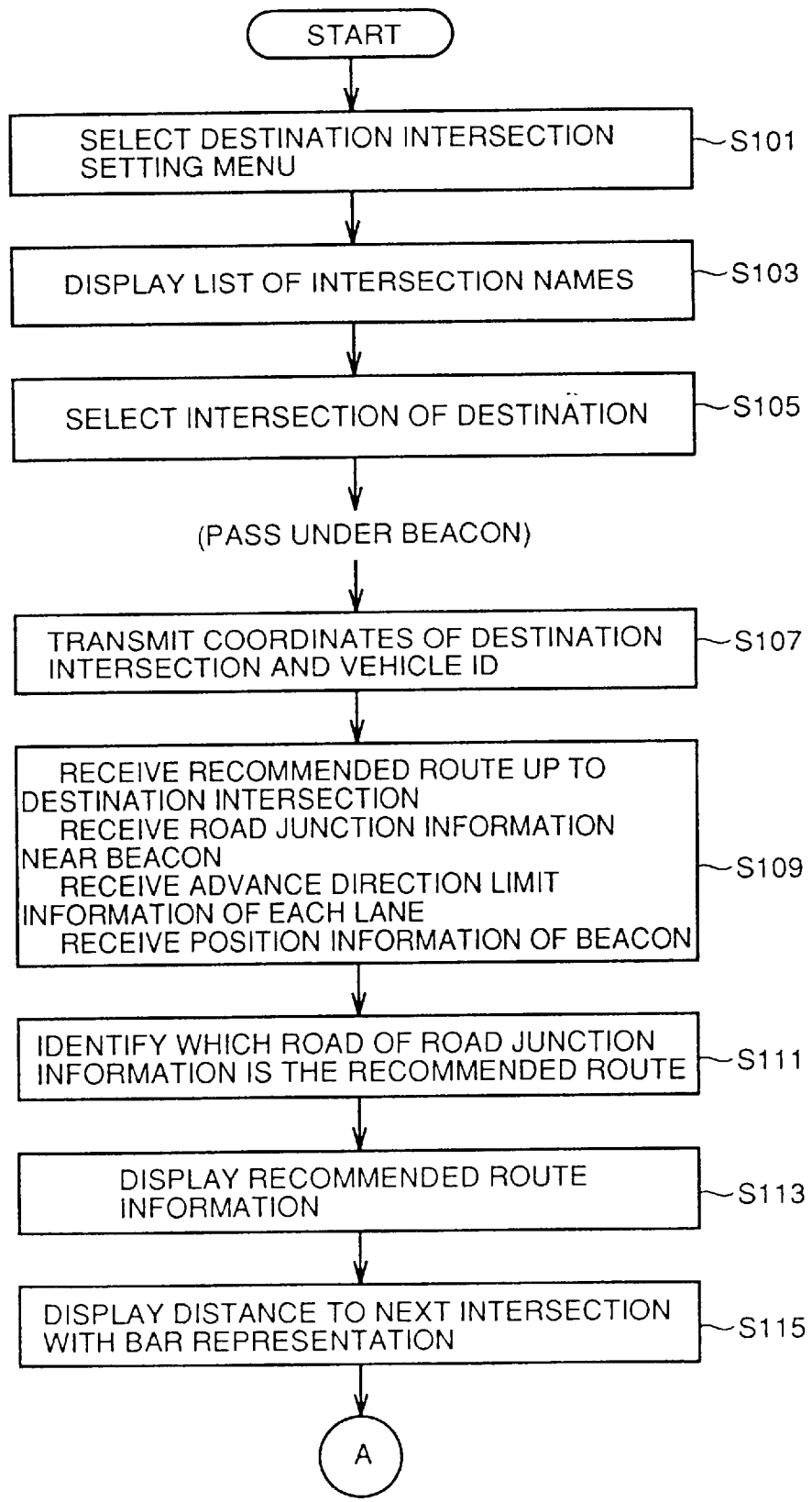
FIGS. 10 and 11 are flow charts showing operations of the car navigation device of FIG. 1 according to the present invention.
Figure 11:
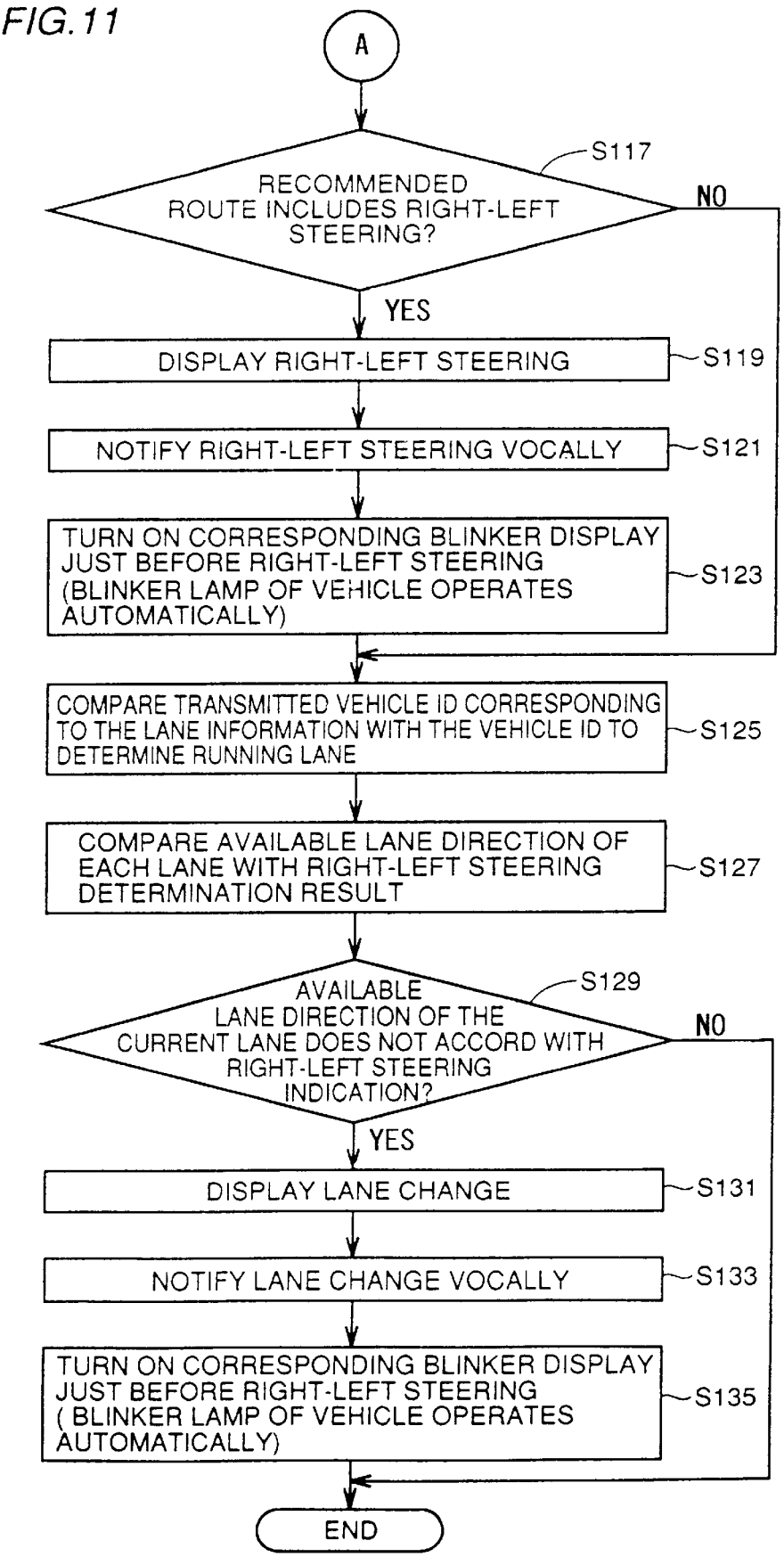

FIGS. 10 and 11 are flow charts showing operations of the car navigation device of FIG. 1.

The flow of the operation of the car navigation device of FIG. 1 will be described generally with reference to the flow charts.

Referring to FIGS. 10 and 11, a setting menu of a destination intersection is selected at step S101 "step" omitted hereinafter). This is effected by depressing "destination" button 21 of switch 1 of FIG. 3. At S103, a list of the names of intersections is displayed. This is simultaneously displayed when "destination" button 21 is depressed. At S105, a destination intersection is selected. This is effected through "Δ" button 23, "∇" button 25, and "set" button 27 of switch 1 of FIG. 3.

At S107, coordinates (or code) of the selected destination intersection and the ID number of the vehicle are transmitted to a beacon on the road by beacon transmitter 9 via control device (computer) 3 of FIG. 1. The beacon on the road in connection with a traffic information center as applicable, selects a recommended route to the destination intersection on the basis of the coordinates of the transmitted destination intersection. The selected recommended route information is transmitted to the beacon on the road together with the road junction information in the proximity of that beacon and available lane direction information for each lane. Here, distance S to the next intersection, absolute coordinates of the current position of the vehicle and the like are sent at the same time.

At step S109, recommended route information to the destination intersection, road junction information in the proximity of the beacon, available lane direction information of the lane on which the vehicle is running, location information of the beacon on the road (current position information of the vehicle), and distance S up to the next intersection are received from the beacon on the road. This is received by beacon receiver 11 to be further provided to control device (computer 3). At S111, a determination is made regarding which road of the road junction information corresponds to the recommended route of the transmitted information. This is carried out by control device (computer) 3.

At S113, recommended route information is displayed by simple display 5. At S115, the distance to the next intersection is shown by the bar representation. This is carried out by simple display 5.

At S117, a determination is made whether the recommended route includes turning to the left or right from the junction road figure. This is carried out by control device (computer) 3. When a determination is made that a left or right turn is included at S117, the determined right/left turn is displayed at S119. This is carried out by simple display device 5. At S121, the right/left steering is notified vocally. This is carried out by audio output device 7. At S123, a corresponding blinker display is turned on just before the right/left turn of the corner. This is carried out by simple display 5. When an automatic blinker function is provided, the blinker lamp of the vehicle is actuated by automatic determination.

The above-described steps S119–S123 are not carried out when the recommended route does not include right-left steering at S117.

At S125, a vehicle ID transmitted with the lane information is compared with an ID of the vehicle to determine the lane on which the vehicle is running. This is carried out by control device (computer) 3. At S127, the available lane direction information for each lane and the result of right/left steering determination are compared. At S129, a determination is made whether the available lane direction of the running vehicle accords with the right/left steering indication. S127 and S129 are carried out by control device (computer) 3.

When the available lane direction does not accord with the right/left steering indication, lane change is displayed at S131. This is carried out by simple display 5. At S133, lane change is guided vocally. This is carried out by audio output device 7. At S135, a corresponding blinker display is turned on prior to lane change. This is carried out by simple display 5. When an automatic blinker function is provided, the blinker lamp of the vehicle is also actuated.

The above-described S131–S135 are not carried out when the lane available direction accords with the right/left steering indication at S129.

Figure 12:
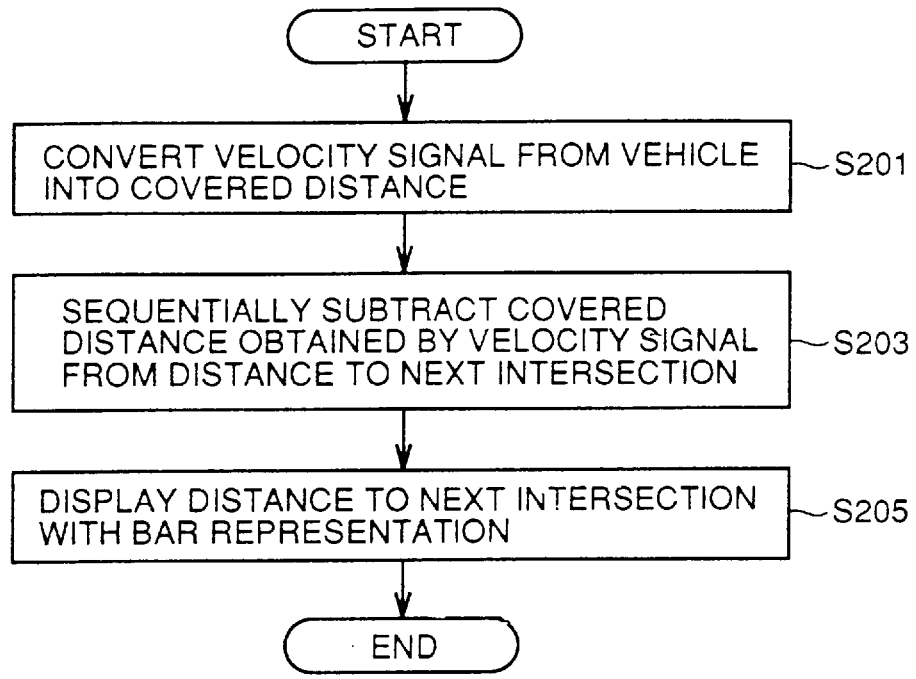
FIG. 12 is a flow chart showing in detail the operation of step S115 of FIG. 10 according to the present invention.

FIG. 12 is a flow chart showing in detail the operation of S115 of FIG. 10.

Referring to FIG. 12, the velocity signal from the vehicle is converted into the covered distance at S201. At S203, the covered distance obtained by the velocity signal is subtracted from the distance to the next intersection. S201 and S203 are carried out by control device (computer) 3. At S205, the distance up to the next intersection is displayed by the bar representation. This is carried out by simple display 5.

Figure 13:
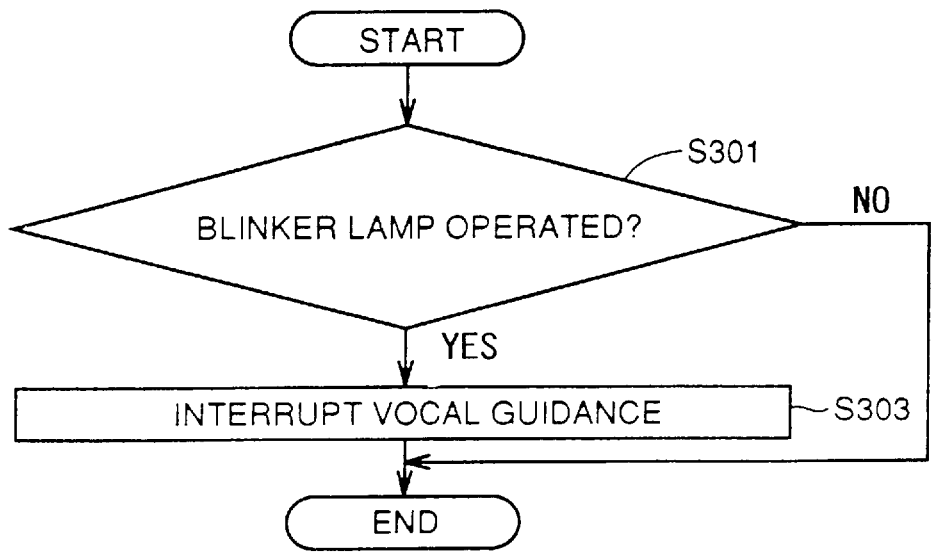
FIG. 13 is a flow chart of an operation when the driver begins to turn to the left or right at step S123 of FIG. 10 or when the driver starts to change the lane at step S135 of FIG. 2.

FIG. 13 is a flow chart showing an operation when the driver begins to turn to the left/right or begins to change the lane according to the indication at S123 or S135, respectively, of FIG. 11.

At FIG. 13, a determination is made whether the blinker lamp is operated or not at S301.

When the blinker is operated at S301, the vocal guidance is interrupted at S303. This is carried out by audio output device 7.

When the blinker lamp is not operated at S301, the vocal guidance is continued.

As described above, the navigation device of the present embodiment receives information of a recommended route from a traffic information center via a beacon on a road to display the received recommended route using characters and a brief pattern figure. Therefore, a CDROM of great capacity or a memory device such as CD drive thereof are not required. A route can be displayed sufficiently with an economic display such as a liquid crystal display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An on-board route display for obtaining, from an external device installed on a road, a recommended route leading a vehicle travelling on the road to a destination and for displaying the recommended route, comprising:

a memory to store names of intersections and information identifying said intersections corresponding to said names, a setting unit to select a desired one of said stored names of intersections as corresponding to a destination intersection, a transmitter to transmit to said external device information for identifying said destination intersection corresponding to said selected desired intersection name based on said information stored in said memory, a receiver to receive recommended route information leading to said destination intersection corresponding to said selected desired intersection name from the external device, and an indicator to indicate a recommended route to a user comprising a brief pattern figure based on said received recommended route information.

2. The on-board route display according to claim 1, further comprising:

an input device to input a signal based on a velocity of the vehicle, an identifier unit to identify a current position of the vehicle from said signal and said received recommended route information, and a distance information display to display distance information from said identified current position of the vehicle to a closest intersection on said recommended route.

3. The on-board route display according to claim 1, wherein said indicator includes a course change indication element to indicate a change of a course when the vehicle arrives at a location where said change of course is required based on said recommended route.

4. The on-board route display according to claim 1, further comprising:

an audio output device that outputs vocal information to a user, a vehicle operation detection device that detects operation of the vehicle, and a suppression device that suppresses said output of said vocal information from said audio output responsive to said indicating carried out by said indicator and said detected operation of the vehicle by said operation detection device.

5. The on-board route display according to claim 4, wherein said indicator includes a course change indication element to indicate a change of course, and wherein said vehicle operation detection device detects the operation of the vehicle according to a signal from a blinker lamp included in the vehicle.

6. The on-board route display according to claim 1, further comprising:

a lane identifying device that identifies a lane of the road on which the vehicle is travelling, an information obtaining device that obtains individual available lane direction information of said identified lane on which the vehicle is travelling from said external device, and an output device that provides lane change information based on said identified lane, said obtained individual available lane direction information, and said recommended route information.

7. The on-board route display according to claim 6, wherein said lane identifying device comprises an ID code transmitter that transmits an ID code of the vehicle to the external device, and a lane identifying information receiver that receives information identifying said identified lane on which the vehicle is travelling together with the ID code from the external device.

8. The on-board route display according to claim 6, further comprising: an actuator that actuates a blinker lamp included in the vehicle according to said lane change information.

9. A traffic information transmission device for transmitting information with respect to a vehicle travelling on any of a plurality of lanes, comprising:

a beacon device provided at a road side, and a plurality of transmitter-receiver units respectively provided corresponding to each of said plurality of lanes and connected to said beacon device, wherein each respective one of said transmitter-receiver units comprises a respective identifying code that identifies said respective one of said transmitter-receiver units, and transmits lane information that identifies a respective one of said lanes with respect to the vehicle travelling thereon according to said identifying code.

10. The traffic information transmission device according to claim 9, wherein each respective one of said transmitter-receiver units receives an ID code from the vehicle travelling on a respective one of said lanes corresponding to said respective transmitter-receiver unit, and transmits said lane information together with said ID code.

11. A route guidance system for directing a vehicle to a destination by a recommended route, comprising: a route display provided in a vehicle, and a route information transmission device provided outside the vehicle for transmitting route information to said route display, wherein said route display comprises:
  a memory adapted to store names of intersections and information for identifying intersections corresponding to said names of intersections,
  a setting unit adapted to select a desired one of said stored names of intersections as corresponding to a destination intersection,
  a transmitter adapted to transmit to said route information transmission device information for identifying said destination intersection corresponding to said selected desired intersection name based on said information stored in said memory,
  a receiver adapted to receive recommended route information leading to said destination intersection corresponding to said selected desired intersection name from said route information transmission device, and
  an indicator adapted to indicate a recommended route to a user comprising a brief pattern figure based on said received recommended route information, and wherein said route information transmission device comprises:
  a plurality of transmitter-receiver units provided on a road at a constant interval from one another and adapted to communicate with the vehicle, and
  a host computer connected to each of said plurality of transmitter-receiver units and adapted to calculate a recommended route to provide said recommended route information.

12. In a vehicle for travelling on a road to a destination, having an on-board navigation aid that includes a display adapted to display navigation information indicating a recommended route leading to said destination and that is adapted to cooperate with an external device installed at a fixed location external to and separate from said vehicle, an improvement wherein said on-board navigation aid comprises, mounted in said vehicle:
  a computer processor,
  a memory connected to said computer processor and adapted to store a plurality of road intersection names and a plurality of road intersection location data respectively associated with said intersection names,
  a user input keyboard connected to said computer processor and including input keys adapted to select one of said intersection names as identifying said destination,
  a transmitter connected to said computer processor and adapted to transmit to said external device a particular one of said intersection location data associated with said selected one of said intersection names,
  a receiver connected to said computer processor and adapted to receive from said external device said navigation information indicating a recommended route leading to said destination identified by said selected intersection name and said particular intersection location data associated therewith, and
  said display, wherein said display comprises a simple graph of fixed line segments interconnected at fixed angles and adapted to have one or more of said fixed line segments used in each case to display said recommended route in a normalized and approximated manner.

13. The improvement in the vehicle according to claim 12, wherein said display further comprises a bar graph having a plurality of bar indicators and adapted to display a variable number of said bar indicators corresponding to a remaining distance to a next intersection on said road along said recommended route.

14. The improvement in the vehicle according to claim 12, wherein said display further comprises a left turn signal blinker lamp and a right turn signal blinker lamp incorporated into said display.

15. The improvement in the vehicle according to claim 12, wherein said display further comprises a first alphanumeric display element adapted to display at least one of said selected intersection name and a name or number identifying said road, a second alphanumeric display element adapted to display a location name identifying a location of said vehicle on said road, and a graphical display adapted to display one or more directions of travel, selected from straight ahead, left turn and right turn, available from a respective lane of said road in which said vehicle is travelling.

16. The improvement in the vehicle according to claim 12, wherein said vehicle further includes a turn signal system having turn signal blinker lamps, and said improvement further comprises a connection between said computer processor and said turn signal system, wherein said computer processor is adapted to automatically activate said turn signal blinker lamps responsive to said navigation information without any input from an operator of said vehicle.

17. The improvement in the vehicle according to claim 12, wherein said vehicle and said navigation aid and said improvement therein do not include a global positioning system receiver, do not include a CD-ROM, do not include a CD-ROM drive, do not include a memory adapted to store map data, and do not include a display adapted to display detailed realistic map data.

18. The improvement in the vehicle according to claim 12, wherein said transmitter comprises a light signal transmitter, and said receiver comprises a light signal receiver.

19. The improvement in the vehicle according to claim 12, further in combination with said external device, wherein said road includes a plurality of lanes, and wherein said external device comprises a centralized traffic information and processing center, a plurality of beacons arranged along said road and in data transmission communication with said center, and respective pluralities of beacon transmitter-receiver units connected to each of said beacons and respectively arranged along and respectively associated with said plurality of lanes.

* * * * *

UNITED STATES PATENT AND TRADEMARK OFFICE
CERTIFICATE OF CORRECTION

PATENT NO. : 5,839,086
DATED : Nov. 17, 1998
INVENTOR(S) : Hirano

It is certified that error appears in the above-identified patent and that said Letters Patent is hereby corrected as shown below:

Col. 3, line 26, after "viewed replace "from the "P" side." by --in the direction of arrow "P".--.
      line 47, after "More" replace "specially," by --specifically,--;
      line 54, before "a" insert --"--;
      line 56, after "method" insert --"--;
      line 57, after "simplicity," insert --it--.

Col. 4, line 4, after "keyboard" insert --1--;
      line 13, after "guides" insert --the user in--;
      line 25, after "a" replace "road side" by --roadside--;
      line 28, after "display" insert --5--;
      line 40, after "route" insert --.--;
      line 56, after "along" delete "on";
      line 59, after "which" delete "by".

Col. 5, line 5, after "disappear" insert --,--;
      line 27, after "of" replace "one" by --a--;
      line 29, before "effectively" insert --from which the distance is--.

Col. 6, line 12, after "search" replace "or" by --for--;
      line 55, before "135°" replace "and" by --or--.

UNITED STATES PATENT AND TRADEMARK OFFICE
CERTIFICATE OF CORRECTION

PATENT NO.   : 5,839,086
DATED        : Nov. 17, 1998
INVENTOR(S)  : Hirano

It is certified that error appears in the above-identified patent and that said Letters Patent is hereby corrected as shown below:

Col. 7, line 39, after "35." insert --At this point, the audio output device 7 of Fig. 1 will emit--;
   line 41, after "is" insert --being--;
   line 64, after "Here," delete "there is";
   line 66, after "passed" insert --"--; after "emitted" delete " " ".

Col. 8, line 16, after "Here," delete "is";
   line 32, after "that" insert --vehicle--.

Col. 9, line 5, before "travel" replace "currently" by --current--;
   line 11, after "of" insert --arrow--;
   line 17, after "2." insert --At--.

Col. 10, line 2, after "S101" insert --(--;
   line 13, after "road" insert --,--.

Signed and Sealed this

Twentieth Day of April, 1999

Attest:

Q. TODD DICKINSON

*Attesting Officer*             *Acting Commissioner of Patents and Trademarks*